United States Patent [19]

Nakamura et al.

[11] Patent Number: 5,729,776
[45] Date of Patent: Mar. 17, 1998

[54] CAMERA HAVING MULTIPLE IMPRINTING AND PHOTOGRAPHIC MODE SETTING AND METHOD FOR PERFORMING SAME

[75] Inventors: Toshiyuki Nakamura, Tokyo; Hidenori Miyamoto, Urayasu; Isao Soshi, Tokyo, all of Japan

[73] Assignee: Nikon Corporation, Tokyo, Japan

[21] Appl. No.: 578,057

[22] Filed: Dec. 22, 1995

Related U.S. Application Data

[63] Continuation of Ser. No. 179,191, Jan. 10, 1994, abandoned.

[30] Foreign Application Priority Data

Jan. 8, 1993 [JP] Japan .................. 5-001772

[51] Int. Cl.⁶ .................................. G03B 17/24
[52] U.S. Cl. .................. 396/310; 396/61; 396/158; 396/48; 396/89
[58] Field of Search .................. 354/105, 106, 354/412, 413, 402, 158, 187, 195.1, 289.1, 289.11, 289.12; 396/310, 48, 89, 297, 61, 158

[56] References Cited

U.S. PATENT DOCUMENTS

| | | | |
|---|---|---|---|
| 4,799,075 | 1/1989 | Ushiro et al. | 354/289.1 |
| 4,990,944 | 2/1991 | Yamamoto et al. | 354/288 |
| 5,111,299 | 5/1992 | Aoki et al. | 358/209 |
| 5,128,704 | 7/1992 | Hayashi et al. | 354/289.1 |
| 5,150,139 | 9/1992 | Tsukahara | 354/106 |
| 5,153,626 | 10/1992 | Yamamoto | 354/187 |
| 5,210,567 | 5/1993 | Takahashi | 354/412 |
| 5,214,462 | 5/1993 | Haraguchi et al. | 354/195.1 X |

Primary Examiner—Russell E. Adams

[57] ABSTRACT

A camera equipped with a date imprinting circuit capable of setting multiple imprinting modes and a photographic mode setting circuit capable of setting multiple photographic modes. The camera includes an operational circuit to set and modify the previously mentioned imprinting modes and photographic modes. A detection circuit detects whether or not the camera is in a first state or a second state. A selection circuit modifies the imprinting mode by operating the operational circuit when the detection circuit detects that the camera is in the first state and modifies the photographic mode by operating the operation circuit when the detection circuit detects that the camera is in the second state.

16 Claims, 6 Drawing Sheets

CAMERA HAVING MULTIPLE IMPRINTING AND PHOTOGRAPHIC MODE SETTING AND METHOD FOR PERFORMING SAME

This application is a continuation of application Ser. No. 08/179,191, filed Jan. 10, 1994, now abandoned.

BACKGROUND OF THE INVENTION

1. Field of the Invention

The present invention relates to a camera that can set multiple imprinting modes and multiple photographic modes. More particularly, the present invention relates to a camera and a method for performing the operation of the camera in which the imprinting modes and the photographic modes are modified by the same operating means to substantially reduce the size of the camera and simplify operation of the camera.

2. Description of the Related Art

Conventional cameras that imprint the date and time on a film surface, that is, cameras equipped with a date imprinting function, are well known. There are many kinds of cameras which are equipped with multiple imprinting modes such as "year-month-day" and "day-hour-minute." In cameras which have these multiple imprinting modes, it is necessary to have operational means for which the camera user can select an imprinting mode. Thus, this kind of camera is equipped with a clock function to hold such data as the date and time for imprinting. There must also be separate operational means to set the time for the clock.

Cameras equipped with multiple photographic modes, such as a normal photography mode, a self-timer photography mode, a strobe flash prevent mode and a forced flash mode are also well known. In this type of camera, a selection means is provided so that the camera user can select various photographic modes. Nonetheless, in these types of conventional cameras, if the camera has multiple photographic modes and multiple data imprinting functions, it is necessary to have separate means for setting the photographic mode and for setting the date imprinting function. The number of operating switches on the camera increases and becomes more complex. Problems exist due to the complexity of the camera, including an increase in size, a lowering of camera operability and an increase in cost.

SUMMARY OF THE INVENTION

It is therefore an object of the present invention to provide a camera capable of setting multiple imprinting modes and multiple photographic modes.

It is a further object of the present invention to reduce the size and simplify operation of a camera.

It is yet another object of the present invention to modify an imprinting mode and a photographic mode by the same operating means.

The above-mentioned objects and other objects are obtained by providing a camera, and a method for performing the operation of the camera, that is equipped with date imprinting means capable of setting multiple imprinting modes (for example, the following modes of "year-month-day," "month-day-year," "day-month-year," "day-time-minute," and "off"). The camera of the present invention is also equipped with a photographic mode setting means capable of setting multiple photographic modes (for example, at least three basic modes including strobe automatic flash, flash prohibit, and forced flash). The date imprinting means and photographic mode setting means are operated by the same switch. The camera of the present invention also includes operational means for modifying the settings of the imprinting mode and photographic mode, detection means for detecting whether the camera is in a first state, for example, a lens barrel retracted state, or a second state, for example, a lens barrel photographic state, and selection means, for modifying the imprinting modes by operating the operational means when the detection means detects that the camera is in the first state, and for modifying the photographic modes by operating the operational means when the detection means detects that the camera is in the second state.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

In a camera and a method for performing the operation of the camera according to the present invention, it is possible to modify an imprinting mode and a photographic mode using the same operational means. The imprinting mode is modified by the operational means when the detection means detects that the camera is in a first state. On the other hand, the photographic mode can be modified by operating the operational means when the detection means detects that the camera is in a second state.

Detailed reference to the present preferred embodiment of the invention will now be made, examples of which are illustrated in the accompanying drawings.

Figure 1:
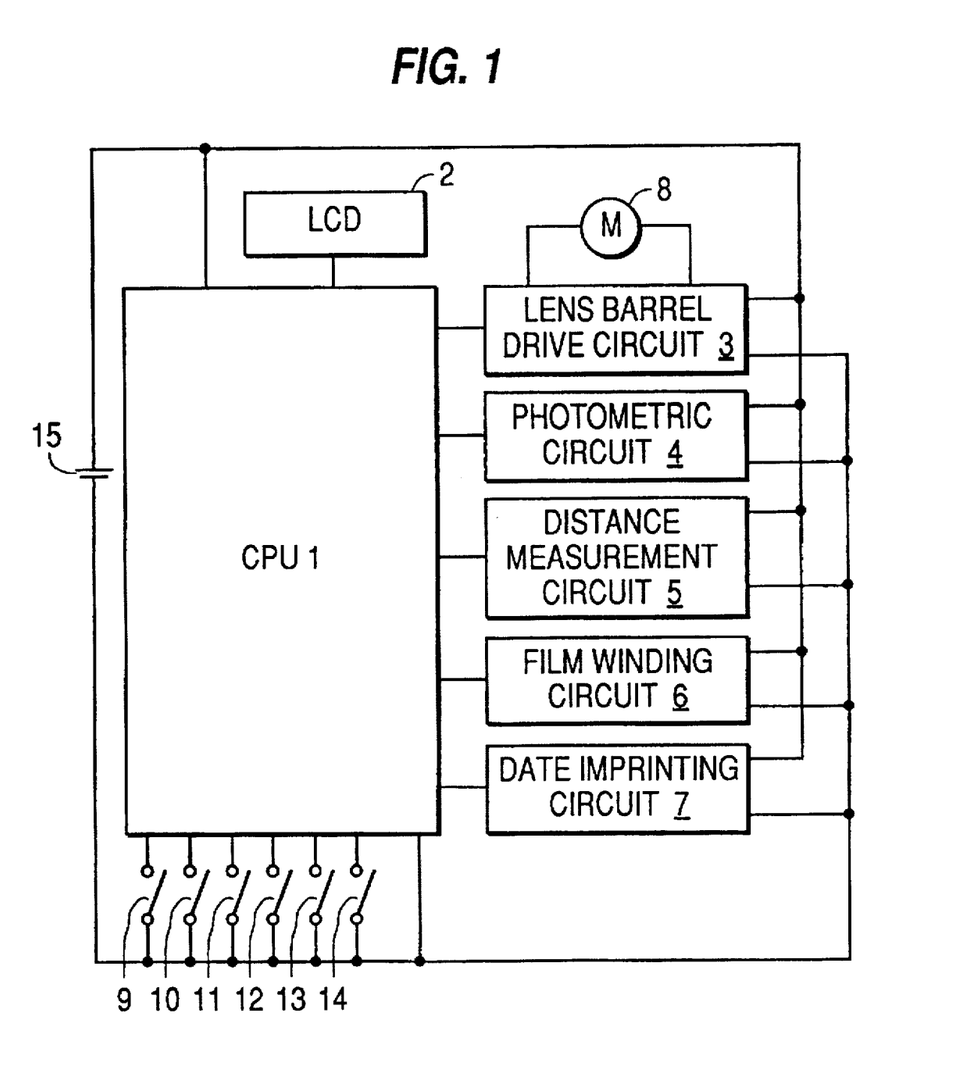
FIG. 1 is a block diagram of an embodiment of a camera according to the present invention.

FIG. 1 is a block circuit diagram of an embodiment of a camera according to the present invention. In FIG. 1, reference numeral 1 indicates a CPU having a one chip microcomputer. CPU 1 controls all sequences of the camera. It also has a function that drives a liquid crystal display (LCD) device 2. A lens barrel drive circuit 3, a photometric circuit 4, a distance measurement circuit 5, a film winding circuit 6, and a date imprinting circuit 7 are connected to CPU 1.

The LCD 2 is arranged on the camera body and displays to the outside or camera user such necessary information as the set photographic mode and the set date imprinting mode according to the signals output from CPU 1. A motor (m) 8 drives a lens barrel (not shown) and is connected to the lens barrel drive circuit 3. The lens barrel drive circuit 3 drives the lens barrel at the stipulated timing based on the directions from CPU 1.

A photometric circuit 4 measures the brightness of the subject at a stipulated timing based on the directions from CPU 1, and sends the light measurement results to CPU 1. A distance measurement circuit 5 measures the distance up to the subject at the stipulated timing based on the directions from CPU 1, and sends the distance measurement results to CPU 1. A film winding circuit 6 winds one frame of film at a time based on directions from CPU 1. A battery 15 is connected to CPU 1, lens barrel drive circuit 3, photometric circuit 4, distance measurement circuit 5, winding circuit 6, and date imprinting circuit 7 for supplying power.

A main switch (MSW) 9 which begins camera action, a strobe switch (SBS) 10 which selects the strobe photographic mode, and a mode switch (MOS) 11 which selects the self-timer photographic mode are connected to CPU 1. Furthermore, a half-push switch 12 which initiates by pushing a release button (not shown) half-way down, a full-push switch 13 which initiates by pushing the release button all the way down, and a lens barrel position detection switch 14 which detects the lens barrel position are connected to CPU 1. All of the switches, except for the lens barrel position detection switch 14, are momentary switches. They automatically return to the original setting when the user releases them (e.g., removes his or her finger).

In this embodiment, there are five strobe modes which are cycled through: an automatic flash mode with red eye reduction, a flash prohibit mode, a forced flash mode, an automatic flash mode with slow shutter speed, and an automatic flash mode without red eye reduction. Also, there are two photographic modes which are cycled through: a normal photographic mode and a self-timer photographic mode. There are also five date modes: "year-month-day," "month-day-year," day-month-year," "day-hour-minute," and "off." A selection mode and a correction mode are provided for setting the date mode. In the selection mode, any one of the five modes mentioned above may be selected. The time settings for the clock data to be imprinted (year, month, day, hour, minute) are corrected by the correction mode.

Figure 2:
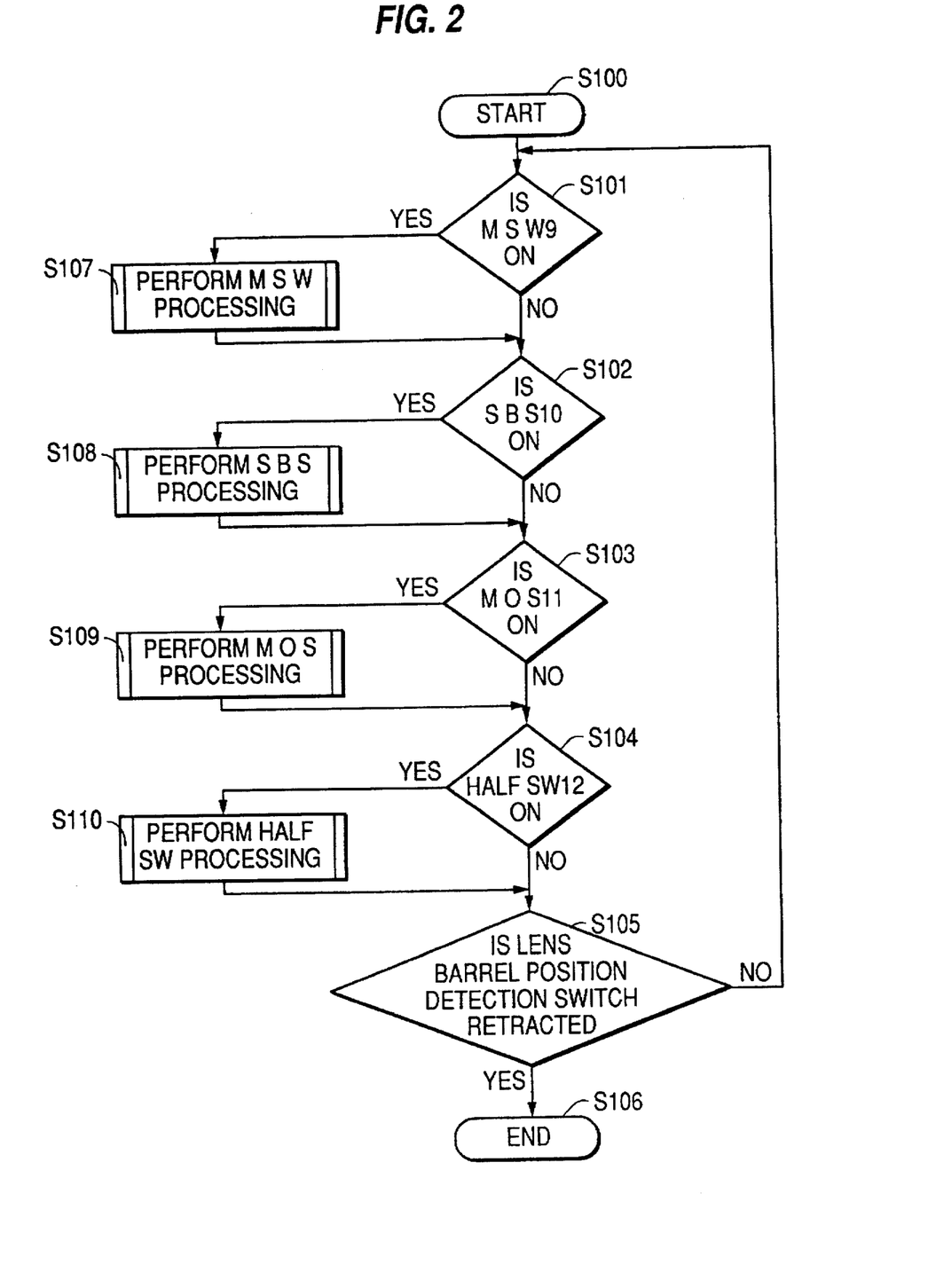
FIG. 2 is a flow chart showing the overall control of the camera in FIG. 1.

FIG. 2 is a flow chart explaining the method for operation of the camera according to the present invention. It is assumed that the power source is already installed.

First, processing begins when the main switch 9 is turned ON (step S100). Immediately after processing is started, because main switch 9 is ON, the process enters a subloop including steps S101 to S107. Main switch processing is therefore executed (step S107). After the main switch processing is completed, the processing returns to the main loop to confirm whether the switches in steps S101, 102, 103, 104, and 105 are ON or OFF. There is also continued confirmation as to whether the main switch 9, strobe switch 10, mode switch 11, or half-push switch 12 are ON, or whether the lens barrel is in the retracted position based on the lens barrel position detection switch 14.

When it is confirmed that the lens barrel is in the retracted position at step S105, the process advances to step S106, and processing is completed. After processing is completed, the system continues to wait for main switch 9 to turn ON. When main switch 9 turns ON, processing begins from step S100.

When it is confirmed at step S101 that the main switch 9 is ON, main switch (MSW) processing is performed (step S107). When it is confirmed at step S102 that the strobe switch (SBS) 10 is ON, strobe switch processing is performed (step S108). When it is confirmed at step S103 that the mode switch 11 is ON, mode switch (MOS) processing is performed (step S109). When it is confirmed at step S104 that the half-push switch 12 is ON, photographic processing is performed (step S110). Main switch processing, strobe switch processing, mode switch processing, and photographic processing will be described in detail later. When all the processing is completed, processing returns to the main and subloops of steps S101, 102, 103, 104 and 105. Again the system continues to confirm whether the switches are ON or OFF.

All the sub-routines in FIG. 2 for main switch processing, strobe switch processing, mode switch processing and photographic processing will be explained with reference to FIGS. 3–6.

Figure 3:
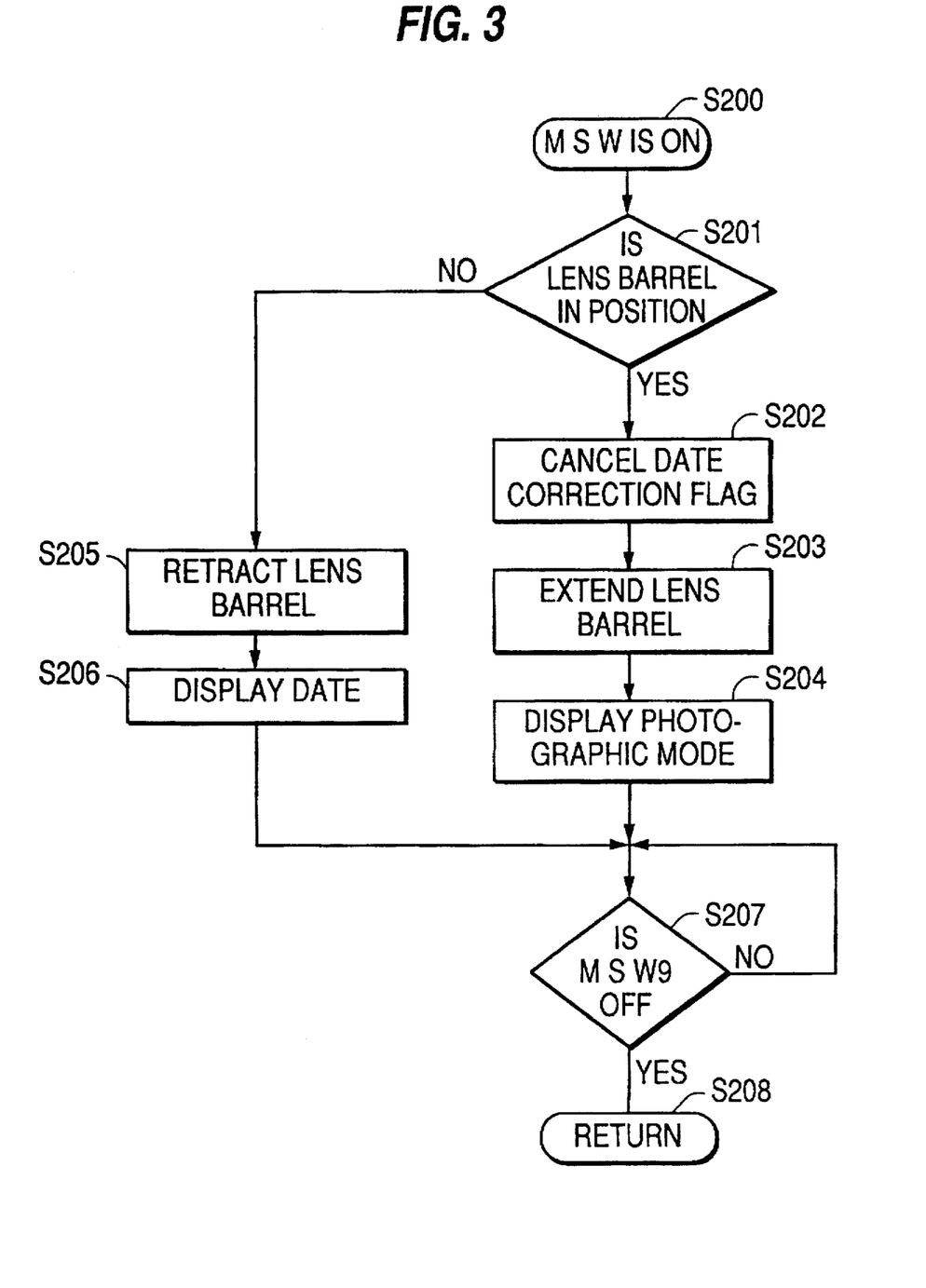
FIG. 3 is a flow chart showing the main switch processing of FIG. 2.

FIG. 3 is a flow chart showing the main switch (MSW) processing of this embodiment. When it is confirmed that the main switch 9 is ON at step S101 in FIG. 2, processing advances to step S107, and the main switch processing in FIG. 3 is commenced (step S200).

First, it is determined whether or not the lens barrel is in a retracted position based on whether the lens barrel position detection switch 14 is ON or OFF (step S201). When the lens barrel position detection switch 14 is ON and the lens barrel is in the retracted position, the date correction flag is cancelled (step S202).

Next, the lens barrel is extended to the photographic position (step 203). The photographic mode is then displayed on the LCD 2 (step S204) and the process advances to step S207.

When it is determined that the lens barrel is not in the retracted position at step S201, the lens barrel is brought into the retracted position (step S205). Next, date imprinting data is displayed on the LCD 2 (step 206). After that, the system waits for the main switch 9 to be turned OFF (step S207). After the main switch 9 turns OFF, the process returns from step S208 to the process in flow chart of FIG. 2.

Figure 4:
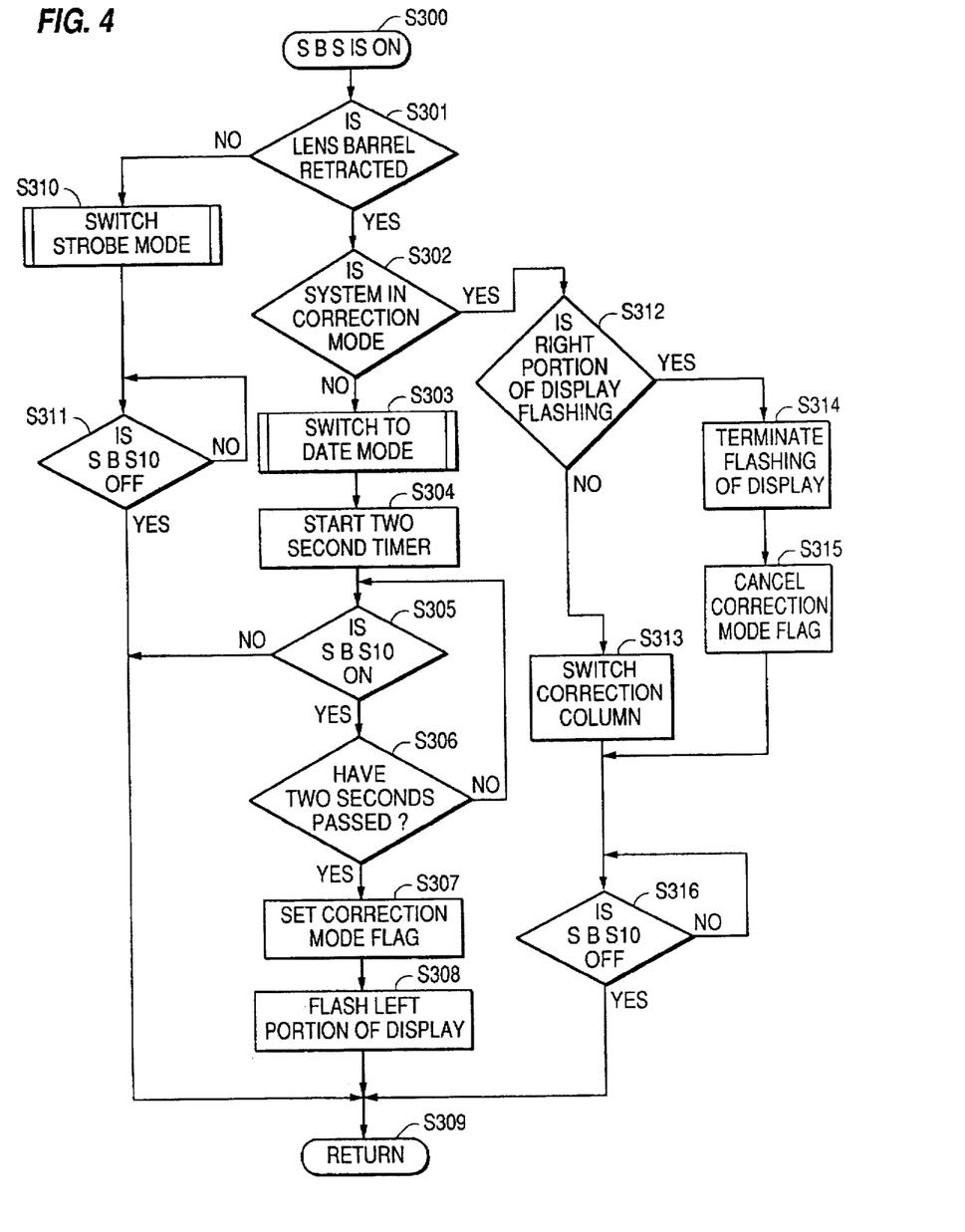
FIG. 4 is a flow chart showing the strobe switch processing of FIG. 2.

FIG. 4 is a flow chart showing the strobe switch processing of this embodiment. When it is confirmed that the strobe switch 10 is ON at step S102 in FIG. 2, processing advances to step S108, and the strobe switch processing in FIG. 4 commences (step S300).

First, it is determined whether or not the lens barrel is in a retracted position based on whether the lens barrel position detection switch 14 is ON or OFF (step S301). When the lens barrel is not in the retracted position (e.g., the lens is extended), the strobe mode is cyclically switched (step S310). There are five strobe modes, as previously set forth, which are cycled through: the automatic flash mode with red eye reduction, the flash prohibit mode, the forced flash mode, the automatic flash mode with slow shutter speed, and the automatic flash mode without red eye reduction. If the mode was in the automatic flash mode with red eye reduction, it is switched to the flash prohibit mode. If the mode was in the flash prohibit mode, it is switched to the forced flash mode. If the mode was in the forced flash mode, it is switched to the automatic flash mode with slow shutter speed. If the mode was in the automatic flash mode with slow shutter speed, it is switched to the automatic flash mode without red eye reduction. If the mode was in the automatic flash mode without red eye reduction, it is switched to the automatic flash mode with red eye reduction. After this, the system waits for the strobe switch 10 to be turned OFF (step S311). When the strobe switch 10 turns OFF, processing returns from step S309 to the process in flow chart of FIG. 2.

On the other hand, when the lens barrel is in the retracted position at step S301, then it is determined whether or not the system has entered the correction mode (step S302). When the system has not entered the correction mode, it is in the selection mode and the system switches to the date mode (step S303). There are five date modes, as previously set forth, which are cycled through: "year-month-day," "month-day-year," "day-month-year," "day-hour-minute," and "off." If the mode was "year-month-day," it switches to "month-day-year"; if the mode was "month-day-year," it switches to "day-month-year"; if the mode was "day-month-year," it switches to "day-hour-minute"; if the mode was "day-hour-minute," it switches to "off"; and if the mode was "off," it switches to "year-month-day."

After this, a two second timer (not shown) starts (step S304). It is then determined whether or not the strobe switch 10 is continuously turned ON (step S305). After the two second timer starts, processing continues through the loop of steps S305 and S306. The system waits for the strobe switch 10 to turn OFF at step S305 or the time of the two second timer to expire at step S306.

If the timer expires at step S306, the correction mode flag is set (step S307). When the correction mode flag is set, the system is in the date correction mode. After this, the left block of the LCD 2 display flashes (step S308). Processing then returns from step S309 to the process in the flow chart of FIG. 2.

The date display on the LCD 2 is displayed in three blocks: a left block, a middle block and a right block. Each of these blocks displays two columns of decimal numbers. Changes follow the order of left to right, e.g., the left block, the middle block, and the right block. While in the correction mode, the left block flashes first. This indicates that the left block can be corrected or changed.

For example, when the selection mode is "year-month-day," the left block displays the "year," the middle block displays the "month," and the right block displays the "day." Then, while in the correction mode, the "year" in the left block flashes first when the mode switch 11 is displayed. This indicates that the year can be corrected or changed. When the correction mode has already been entered at step S302, it is confirmed whether or not the right block is flashing (step S312). When the right block flashes, the corrections or changes of all blocks have been made. The LCD 2 then stops flashing (step S314) and the correction mode flag is cancelled (step S315). By doing this, the system exits the correction mode.

After this, the system waits for the strobe switch 10 to turn OFF (step S316). When the strobe switch 10 turns OFF, processing returns from step S309 to the process in the flow chart of FIG. 2.

If the right block of the LCD 2 is not flashing in step S312, the correction column is shifted. If the left block of the LCD 2 is flashing, the correction column is switched to the middle block of the LCD 2. If the middle block is flashing, the correction column is switched to the right block of the LCD 2 (step S313).

The system then waits for the strobe switch 10 to be turned OFF (step S316). When the strobe switch 10 turns OFF, processing returns from step S309 to the process in the flow chart of FIG. 2.

Figure 5:
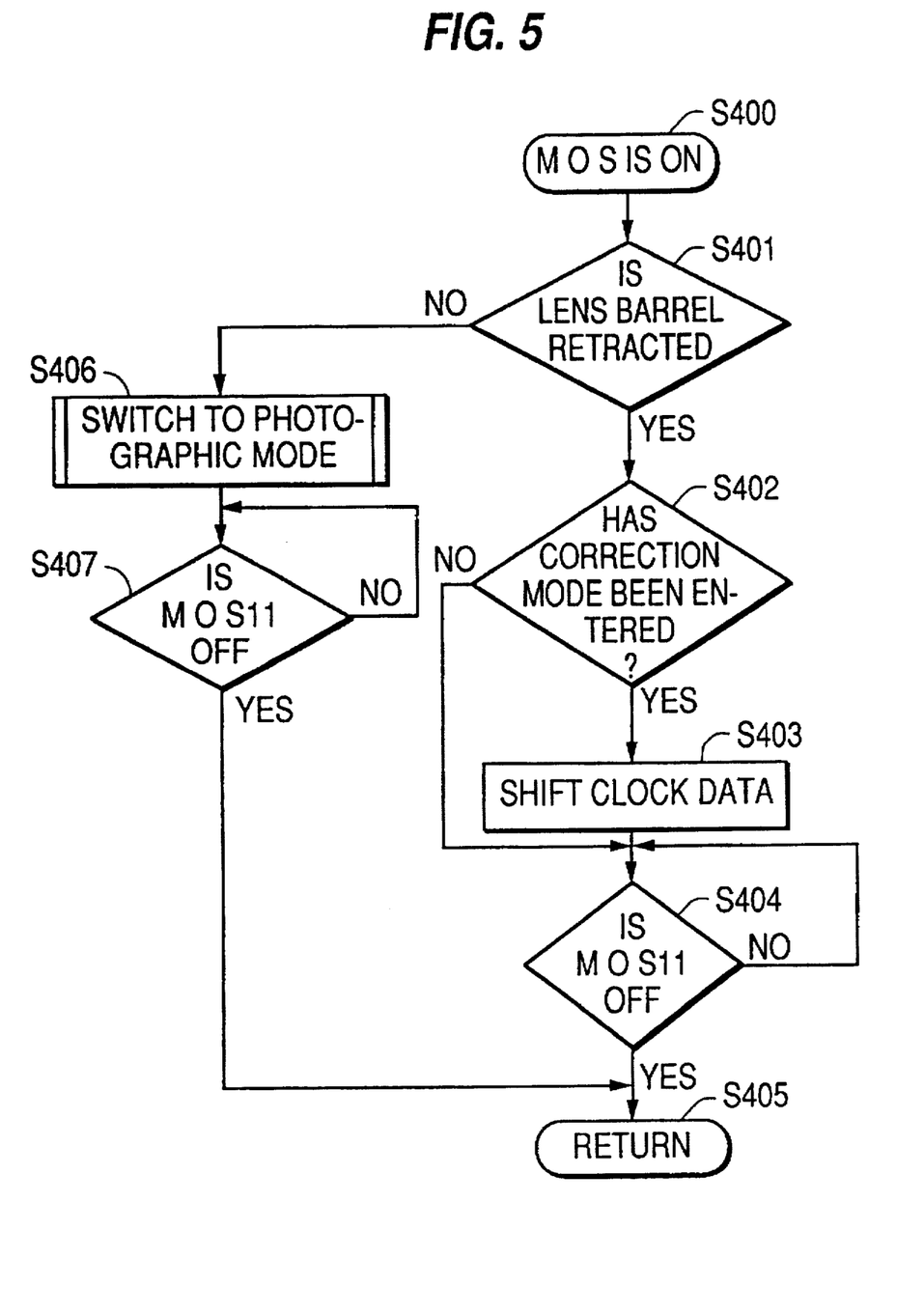
FIG. 5 is a flow chart showing the mode switch processing of FIG. 2.

FIG. 5 is a flow chart showing the mode switch processing of this embodiment. When it is confirmed that the mode switch 11 is ON at step S103 in FIG. 2, processing advances to step S109, and the mode switch processing shown in FIG. 5 is commenced (step S400).

First, it is determined whether or not the lens barrel is in the retracted position (step S401) based on whether the lens barrel position detection switch 14 is ON or OFF. When the lens barrel is not in the retracted position, the system switches to the photographic mode (step S406).

There are two photographic modes: a normal photographic mode and a self-timer photographic mode. If the photographic mode is in the normal photographic mode, the mode switches to the self-timer photographic mode. If the photographic mode is in the self-timer photographic mode, the mode switches to the normal photographic mode. After that, the system waits for the mode switch 11 to be turned OFF (steps S407). When mode switch 11 turns OFF, processing returns from step S405 to the process in the flow chart of FIG. 2.

When the lens barrel is in the retracted position at step S401, it is confirmed whether or not the correction mode has already been entered (step S402). If the correction mode has not been entered, the system waits for the mode switch 11 to turn OFF (step S404). When mode switch 11 turns OFF, processing returns from step S405 to the process in the flow chart of FIG. 2. If the correction mode has been entered at step S402, clock data is shifted (step S403).

In the left block, the middle block and the right block of the LCD 2, a 1 is added, by pressing the operational means, to the block data ("year," "month," "day," "hour" or "minute") which is flashing at that time. For example, when the display mode is "year-month-day," and the "year" of the left block is set to the year "94" and is flashing, the flashing display is switched from the year "94" to "95" when the operational means is pressed. It is then confirmed that the mode switch 11 is OFF (step S404). Processing then returns from step S405 to the process in the flow chart of FIG. 2.

Figure 6:
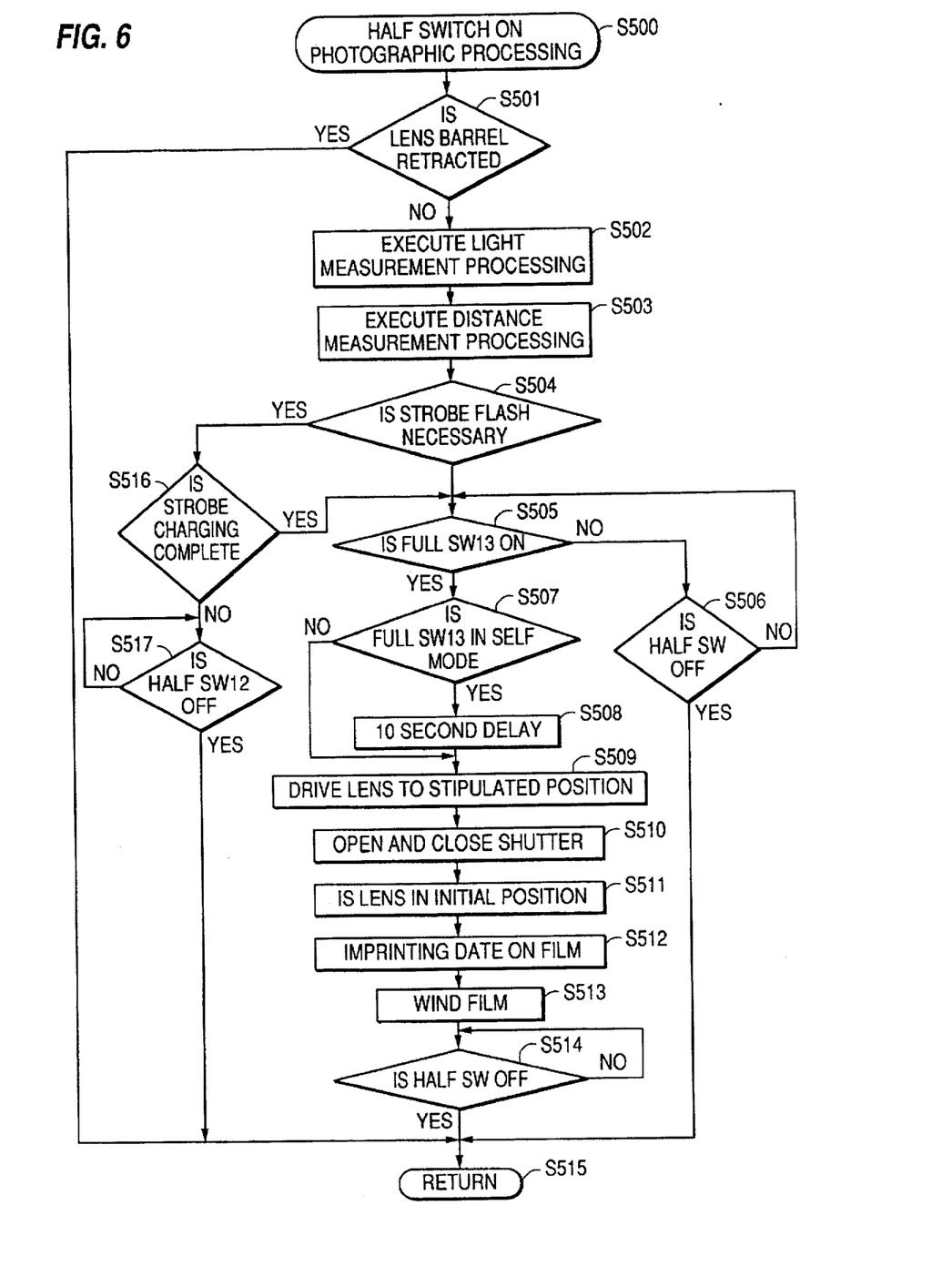
FIG. 6 is a flow chart showing the photographic processing of FIG. 2.

FIG. 6 is a flow chart showing the photographic processing of this embodiment.

When it is confirmed at step S104 of FIG. 2 that the half-push switch 12 is ON, processing advances to step S110, and the photographic processing of FIG. 5 is commenced (step S500).

First, it is determined whether or not the lens barrel is in the retracted position (step S501) based on whether the lens barrel detection switch 14 is ON or OFF. If the lens barrel is in the retracted position, taking a photograph is prohibited, and processing returns from step S515 to the process in the flow chart of FIG. 2. If the lens barrel is not in the retracted position, a signal is sent to the photometric circuit 4, and light measurement processing is executed (step S502).

The details of light measurement processing are omitted as various implementations are known. The brightness of the subject is calculated from the quantity of light that has been received by light receiving elements in the photometric circuit 4. Shutter aperture time is then obtained. At the same time, it is decided whether there is low brightness and whether or not a strobe flash is necessary.

During the automatic flash mode, the strobe will flash according to the calculated brightness. During the flash prohibiting mode, the strobe will not flash regardless of the calculated brightness. During the forced flash mode, the strobe will flash regardless of the calculated brightness.

Next, distance measurement processing is executed (step S503). Specifically, CPU 1 sends a signal to the distance measurement circuit 5 to begin distance measurement. The distance measurement circuit 5 then begins the distance measurement processing. The details of distance measurement processing are omitted as various implementations are known. When the distance measurement has been completed, the distance measurement circuit 5 outputs the distance measurement results to CPU 1.

It is then determined whether or not a strobe flash is necessary (step S504). If the strobe is not to be flashed, processing advances to step S505. If the strobe is to be flashed, it is determined whether or not strobe charging has been completed (step S516). If strobe charging has been completed, processing advances to step S505. When charging has not been completed, the system waits for the half-push switch 12 to be turned OFF (step S517). At this time, photographs are not taken. When the half-push switch 12 turns OFF, processing returns from step S515 to the process in the flow chart of FIG. 2.

If the strobe is not to be flashed, or if the strobe is to be flashed and charging is complete, photographs can be taken. Processing then advances to the loop constituting steps S505 and S506. When it is confirmed at step S506 that the half-push switch 12 is OFF, processing returns from step S515 to the process in the flow chart of FIG. 2. In this situation, photographs are not taken.

When it is confirmed at step S505 that the full-push switch 13 is ON, it is determined whether or not the camera is in the self mode (step S507). If it is not in the self mode, processing advances to step S509.

When the camera is in the self mode, there is a 10-second delay or standby (step S508). When the ten seconds expire, the lens is driven to the stipulated position according to the distance measurement value obtained in step S503 (step S509). As processing continues, the shutter opens and closes (step S510). If the camera is in the strobe flash mode, the strobe flashes in the same time period as the shutter is opened and closed. After that, the lens is returned to its initial position (step S511).

The date is then imprinted on the film surface by the date imprinting circuit 7 according to the date mode that has been set (step S512). The film is then wound by winding circuit 6 (step S513). The system waits for the half-push switch 12 to turn OFF (step S514). When it is confirmed at step S514 that the half-push switch 12 is OFF, processing returns from step S515 to the process in the flow chart of FIG. 2.

Although it is not indicated in the flow chart, after the strobe has flashed, strobe charging begins. When strobe charging begins, the system continues to confirm whether the strobe charge is complete, and when it is complete, charging is terminated.

In the camera described above, as indicated in FIG. 4, for example, the five imprinting modes of "year-month-day," "month-day-year," "day-month-year," "day-hour-minute" and "off" are modified by operating the strobe switch 10 when the lens barrel position detection switch 14 detects that the lens barrel of the camera is in the retracted position. Also, the three photographic modes including the automatic strobe flash mode, the flash prohibit mode and the forced flash mode are modified by operating the strobe switch 10 when the lens barrel position detection switch 14 detects that the lens barrel of the camera is in the photographic position. Therefore, both the modification of the imprinting mode and the modification of the photographic mode can be executed by the same strobe switch 10. Thus, it is not necessary to add a separate switch. This greatly simplifies the operation of the camera and reduces the size of the camera compared to conventional cameras.

In the embodiment described above, the explanation is of an example in which the imprinting mode and the photographic mode are selected by determining whether the lens barrel is in the retracted position or in the photographic position. The present invention, however, is not limited to this kind of embodiment. For example, the selection of the imprinting mode or photographic mode could also be executed by the main switch 9.

Moreover, in the embodiment described above, the explanation was for a situation in which the number of switches for setting the photographic function is two. The present invention is, of course, not limited to this type of embodiment. For example, the present invention could also apply to situations using three or more switches.

Furthermore, in the embodiment described above, the explanation was of an example in which the date was imprinted prior to winding the film. The present invention is, of course, not limited to this kind of embodiment. For example, the present invention could also apply to a date imprinting system in which the date is imprinted in dot form by the flashing of multiple LEDs while the film is winding.

In a camera according to the present invention as explained above, the imprinting mode is modified by operation of the operational means when the detection means detects that the camera is in a first state, and the photographic mode is modified by operation of the operational means when the detection means detects that the camera is in the second state. The present invention provides the advantages that it is possible to modify the imprinting mode and modify the photographic mode using the same operational means. As a result, it is not necessary to increase the number of operational means. This greatly simplifies the operation of the camera and reduces the size of the camera compared to conventional cameras.

Although a preferred embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A camera, comprising:
   a date imprinting circuit for setting multiple imprinting modes;
   a photographic mode setting circuit for setting multiple photographic modes;
   an operational circuit, connected to said date imprinting circuit and said photographic mode setting circuit, for modifying the settings of the imprinting modes and the photographic modes;
   a movable lens barrel having a first state and a second state;
   a detection device to detect whether the lens barrel of the camera is in the first state or the second state; and
   a selection circuit, operatively connected to said operational circuit, for modifying the imprinting modes by operating said operational circuit when said detection device detects that the camera is in the first state, and for modifying the photographic modes by operating said operational circuit when said detection device detects that the camera is in the second state.

2. A camera as claimed in claim 1, wherein the movable lens barrel has a retracted position and a photographic position, and wherein the first state is when the movable lens barrel is in the retracted position, and the second state is when the movable lens barrel is in the photographic position.

3. A camera as set forth in claim 1, wherein the camera includes a main switch which is OFF or ON, wherein the first state is when said main switch is OFF and wherein the second state is when said main switch is ON.

4. A camera as claimed in claim 1, further comprising a strobe, wherein said operational circuit includes a strobe switch.

5. A camera as claimed in claim 1, wherein said multiple imprinting modes include a date setting mode.

6. A camera as claimed in claim 5, wherein said date setting mode includes a year-month-day mode, a month-day-year mode, a day-month-year mode, a day-time-minute mode and an off mode.

7. A camera as claimed in claim 6, wherein said date is set when the camera is in one of a selection mode.

8. A camera as claimed in claim 1, further comprising a flash controlled by the photographic mode setting circuit, wherein said multiple photographic modes include a flash prohibit mode and a forced flash mode.

9. A camera as recited in claim 8, wherein said multiple photographic modes include an automatic flash mode with slow shutter speed.

10. A camera as recited in claim 8, wherein said multiple photographic modes include an automatic flash mode without redeye reduction.

11. A camera as recited in claim 8, wherein said multiple photographic modes include an automatic flash mode with redeye reduction.

12. A camera, comprising:
   a date imprinting circuit for setting multiple imprinting modes;
   a photographic mode setting circuit for setting multiple photographic modes;
   an operational circuit, connected to said date imprinting circuit and said photographic mode setting circuit, for modifying the settings of the imprinting modes and the photographic modes;
   a lens barrel having a retracted position and a photographic position;
   detection means for detecting whether the lens barrel of the camera is in the retracted position or the photographic position; and
   a selection circuit, operatively connected to said operational circuit, for modifying the imprinting modes by operating said operational circuit when said detection means detects that the lens barrel is in the retracted position, and for modifying the photographic modes by operating said operational circuit when said detection means detects that the lens barrel is in the photographic position.

13. A method for modifying an imprinting mode and a photographic mode by the same operational means of a photographic apparatus, the method comprising the steps of:
   (a) turning a main switch ON;
   (b) performing main switch processing, said step (b) comprising the substeps of:
      (i) determining whether a lens barrel is retracted;
      (ii) cancelling a date correcting flag when the lens barrel is in a retracted position;
      (iii) extending the lens barrel to a photographic position;
      (iv) displaying a photographic mode;
      (v) retracting the lens barrel when it is determined not to be in a retracted position in said substep (i); and
      (vi) displaying date data to be imprinted on photographic storage media;
   (c) turning a strobe switch ON;
   (d) performing strobe switch processing;
   (e) turning a mode switch ON for selecting a mode;
   (f) performing mode switch processing;
   (g) pushing a release button halfway to turn ON a half-push switch; and
   (h) performing photographic processing.

14. A method for modifying an imprinting mode and a photographic mode by the same operational means of a photographic apparatus, the method comprising the steps of:
   (a) turning a main switch ON;
   (b) performing main switch processing;
   (c) turning a strobe switch ON;
   (d) performing strobe switch processing, said step (d) comprising the substeps of:
      (i) determining whether a lens barrel is retracted;
      (ii) determining whether the camera is in a correction mode or a selection mode;
      (iii) switching, when the camera is in a selection mode, to a date mode;
      (iv) cycling through the date mode;
      (v) starting a timer;
      (vi) determining whether the strobe switch is ON;
      (vii) determining whether the timer has expired;
      (viii) setting a correction mode flag when it is determined the timer has expired;
      (ix) setting a date correction mode;
      (x) cycling through a strobe mode when the lens barrel is extended; and
      (xi) determining whether the strobe switch is OFF;
   (e) turning a mode switch ON for selecting a mode;
   (f) performing mode switch processing;
   (g) pushing a release button halfway to turn ON a half-push switch; and
   (h) performing photographic processing.

15. A method for modifying an imprinting mode and a photographic mode by the same operational means of a photographic apparatus, the method comprising the steps of:
   (a) turning a main switch ON;
   (b) performing main switch processing;
   (d) performing strobe switch processing;
   (e) turning a mode switch ON for selecting a mode;
   (f) performing mode switch processing, said step (f) comprising the substeps of:
      (i) determining whether a lens barrel is retracted;
      (ii) determining whether the correction mode has been entered;
      (iii) shifting clock data if the correction mode has been entered;
      (iv) switching to a photographic mode if the lens barrel is not retracted; and
      (v) turning OFF the mode switch;
   (g) pushing a release button halfway to turn ON a half-push switch; and
   (h) performing photographic processing.

16. A method for modifying an imprinting mode and a photographic mode by the same operational means of a photographic apparatus, the method comprising the steps of:
   (a) turning a main switch ON;
   (b) performing main switch processing;
   (c) turning a strobe switch ON;
   (d) performing strobe switch processing;
   (e) turning a mode switch ON for selecting a mode;
   (f) performing mode switch processing;
   (g) pushing a release button halfway to turn ON a half-push switch; and
   (h) performing photographic processing, said step (h) comprising the substeps of:
      (i) determining whether a lens barrel is retracted;
      (ii) executing light measurement processing when it is determined the lens barrel is not retracted;
      (iii) executing distance measurement processing;
      (iv) determining whether a strobe flash is necessary;
      (v) determining whether the camera is in a self-timer photographic mode; and
      (vi) imprinting a date onto photographic storage media.

* * * * *